United States Patent [19]

Berry

[11] 4,335,383

[45] Jun. 15, 1982

[54] METHOD AND APPARATUS FOR DIGITALLY DETERMINING THE SPEED OF A TARGET VEHICLE WHILE THE RADAR PLATFORM VEHICLE IS IN MOTION

[75] Inventor: Fred M. Berry, Lenexa, Kans.

[73] Assignee: Kustom Electronics, Inc., Lenexa, Kans.

[21] Appl. No.: 204,587

[22] Filed: Nov. 6, 1980

Related U.S. Application Data

[63] Continuation of Ser. No. 11,210, Feb. 12, 1979, abandoned.

[51] Int. Cl.³ .............................................. G01S 13/58
[52] U.S. Cl. ...................................... 343/8; 343/7 PL
[58] Field of Search ................................... 343/7 PL, 8

[56] References Cited

U.S. PATENT DOCUMENTS 3,438,031  4/1969  Fathauer .................................. 343/8
3,936,824  2/1976  Aker et al. ............................... 343/8
4,214,243  7/1980  Patterson ................................. 343/8

Primary Examiner—T. H. Tubbesing
Attorney, Agent, or Firm—Lowe, Kokjer, Kircher, Wharton & Bowman

[57] ABSTRACT

A moving doppler radar unit capable of separating the incoming doppler signal into its respective frequency components by means of frequency translation techniques and fixed frequency filters is disclosed. When the radar platform vehicle and target vehicle are both moving, the received doppler signal is a complex wave having frequency components related to the ground speed of the platform vehicle and the relative speed of the platform and target vehicles with respect to each other. Separation of the received doppler signal into its respective frequency components is accomplished by frequency translating the received doppler signal to a preselected reference frequency, discriminating between the frequency translated platform speed and target speed frequency components by means of a narrow band filter and a band pass filter, and frequency translating the separated frequency components downward to provide speed signals representative of the ground speed of the radar platform vehicle and the ground speed of the target vehicle. These speed signals are then converted into digital speed information which can be conventionally displayed. A lock detection circuit is included to inhibit the speed computation if the received doppler signal is not properly frequency translated to the reference frequency.

35 Claims, 7 Drawing Figures

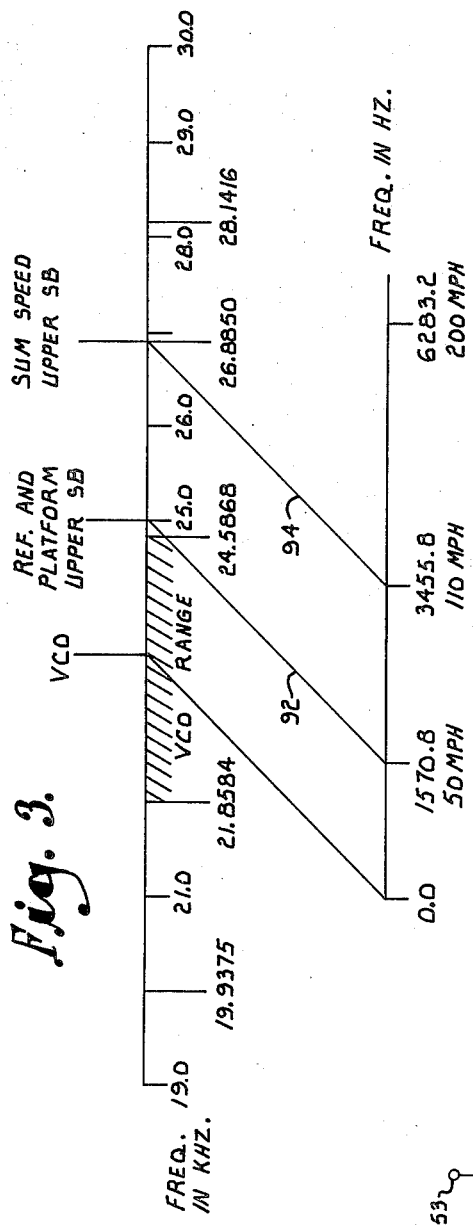
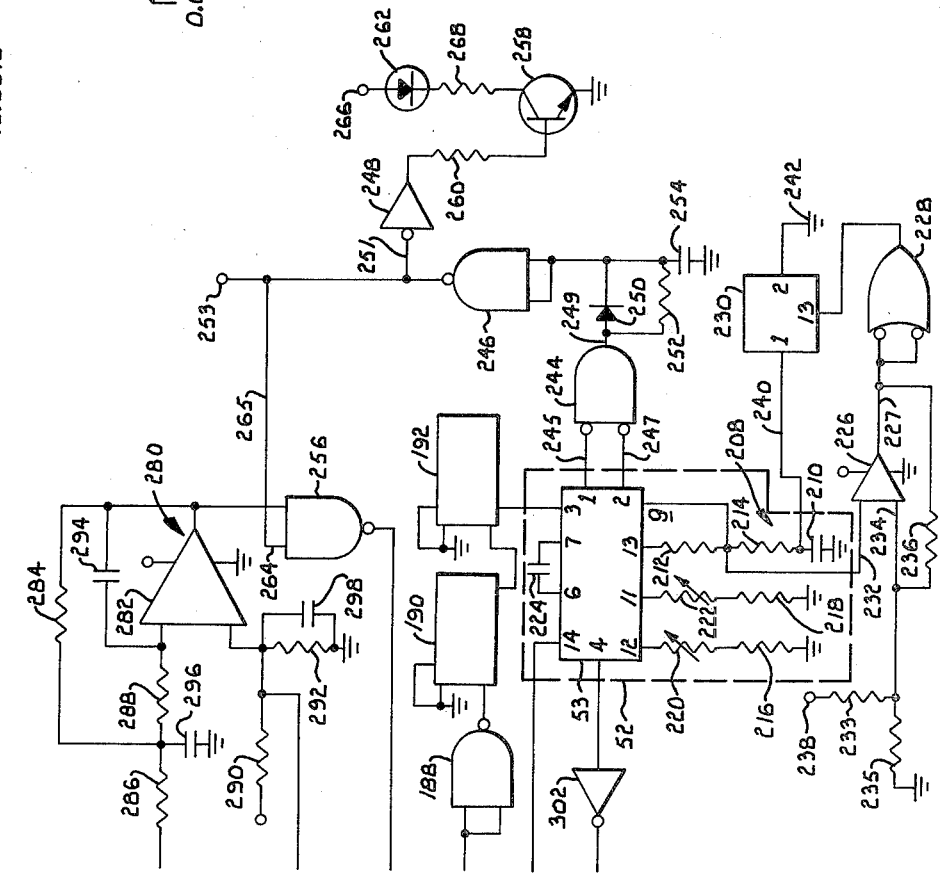

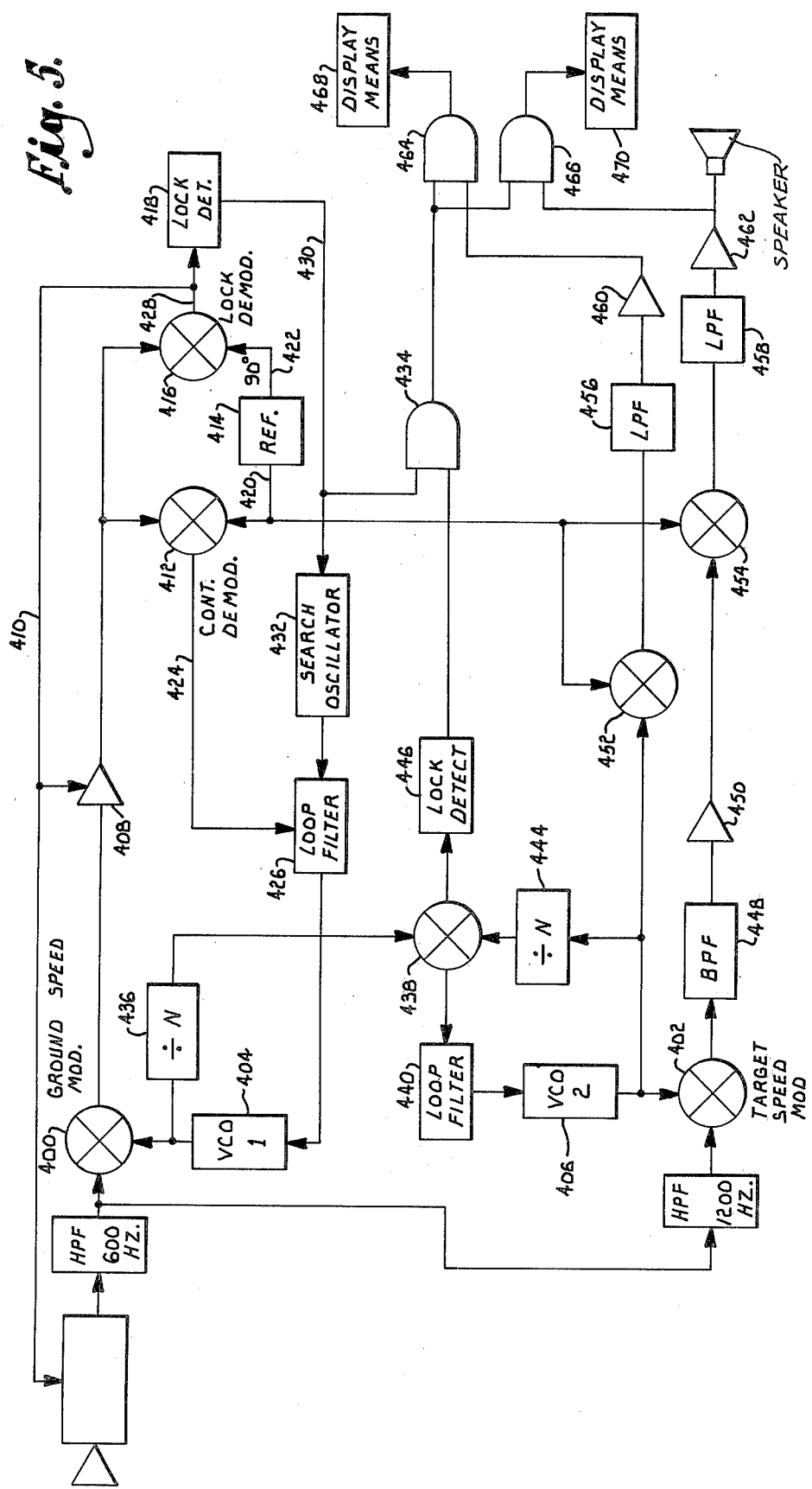

METHOD AND APPARATUS FOR DIGITALLY DETERMINING THE SPEED OF A TARGET VEHICLE WHILE THE RADAR PLATFORM VEHICLE IS IN MOTION

This is a continuation, of application Ser. No. 011,210, filed Feb. 12, 1979, now abandoned.

BACKGROUND AND DESCRIPTION OF THE INVENTION

This invention relates in general to a frequency discriminator for use in a doppler radar unit having a moving and stationary mode of operation. In particular, this invention relates to a method and apparatus for separating the received doppler signal into its platform speed and target speed frequency components by means of frequency translation techniques.

The use of doppler radar techniques for measuring the speed of moving objects and more particularly for measuring the speed of motor vehicles is well known in the art. In these systems, an ultra high frequency radar signal is radiated toward the vehicle under observation. Upon contact with the target vehicle, a portion of the transmitted doppler wave is reflected back to the radar unit. Thereafter, the reflected wave is received and mixed with a sample portion of the transmitted wave to measure the difference in frequency between the reflected signal and the transmitted wave. This frequency differential is produced by the relative motion of the target vehicle with respect to the measuring device and is proportional to the ground speed of the target vehicle. By their nature, raw or unfiltered doppler return signals are often very inaccurate. This inaccuracy is due to a large noise level that typically occurs because of white noise, reflection difficulties due to multiple targets and/or the dropping of pulses at critical intervals so that incorrect and erroneous displays are prevalent in conventional prior art devices. A general solution to these prior art difficulties is given and described in U.S. patent to Berry U.S. Pat. No. 3,689,921, issued Feb. 5, 1972, which is incorporated by reference herein.

It has become apparent that the efficiency of selective electronic speed limit law enforcement can be greatly enhanced if the radar platform, conventionally a police patrol car, is capable of movement during such enforcement and surveillance. A number of devices presently known in the art attempt to impart movement capability to the radar platform vehicle. An example of such a radar device is described in the U.S. patent Aker et al., U.S. Pat. No. 3,936,824, issued Feb. 3, 1976, which is incorporated by reference herein.

The Mahler U.S. Pat. No. 3,394,371, issued July 23, 1968, and titled Vehicle Motion Nulling System is believed to represent a complex missle tracking circuit which employs doppler radar and some translation techniques.

When both the target vehicle and the radar platform vehicle are in motion, the received doppler signal is a complex wave composed of at least two frequency components. One of the received frequency components is produced by the waves reflected from the road and other stationary objects in the environment and is related to the ground speed of the platform vehicle. The second frequency component is generated by the waves reflected from the target vehicle and is representative of the relative speed of the target vehicle with respect to the radar platform vehicle. This frequency component is related to the sum speed of the two vehicles if they are moving in opposite directions or to the difference in speed between the two vehicles if they are moving in the same direction. It should be noted that the frequency of the relative speed component will always be higher than the frequency of the platform speed frequency component if the radar platform vehicle and the target vehicle are traveling in opposite directions.

The ground speed of an approaching target vehicle is typically computed by first obtaining the composite frequencies of the received doppler signals and then separating the received signals into platform and sum speed frequency components. These frequency components are then correlated with a time base to obtain digital numbers representative of the platform speed and the sum speed of the two vehicles. Thereafter, the computed platform speed is subtracted from the sum speed leaving a digital number representative of the ground speed of the target vehicle. As illustrated above, the proper computation of the resultant target speed is dependent upon the effective separation of the received doppler signal into its respective frequency components. Prior art radar devices perform the required frequency discrimination by means of selective filtering systems that employ tracking filters which are tunable over the entire range of doppler input frequencies. The center frequency of these tracking filters is initially set to the speed of the radar platform vehicle and then continuously updated during the detection cycle. The tracking function performed by these systems necessitates the use of very complicated and expensive circuitry.

My invention, on the other hand, uses frequency translation techniques and preset filters to accomplish the required frequency discrimination. The platform speed and sum speed frequency components are frequency translated in the present invention in such a way as to lock the translated platform speed frequency component to a preselected reference frequency. The required frequency discrimination is then performed by a narrow band pass filter and a wide band pass filter. The narrow band pass filter has a center frequency which is equal to the preselected reference frequency and is therefore operable to pass only the frequency translated platform speed frequency component. The wide band pass filter, on the other hand, allows passage of the frequency translated sum speed frequency component while supressing the translated platform speed frequency component. In this way, the required frequency discrimination is performed by filters which are fixed in frequency and properly selected so that only one frequency component is passable by each of the filters. The separated frequency components are then frequency translated downward to provide a platform speed frequency signal and a target speed frequency signal. The frequency of the platform speed frequency signal is related to the ground speed of the platform vehicle while the frequency of the target speed frequency signal is related to the ground speed of the target vehicle allowing direct computation of target speed.

It has been found to be of benefit in the application of doppler radar for measurement of vehicular speeds to aurally monitor the target doppler signal, especially in multiple target situations. Accordingly, several manufacturers presently incorporate audio circuitry in their radar units to accomplish this. In all prior art devices, the audio note heard in the moving mode of operation is representative of the closing rate between the platform vehicle and the target vehicle, rather than the rate of the target vehicle alone.

In the present invention, the frequency translation results in a subtraction of the platform doppler frequency component from the combined speed frequency component, leaving a target speed frequency component which is independent of platform velocity. The frequency or doppler note heard by the operator is therefore a function only of target speed and does not vary with platform as is the case in other radar units.

The frequency translation technique employed in the present invention is accomplished by using the received doppler signal to modulate a carrier signal which is generated by the voltage controlled oscillator (VCO) of a phase locked loop. The phase locked loop is operable to compare the frequency and phase of the frequency translated platform speed frequency component with the preselected reference signal and to produce a carrier signal capable of keeping these two signals locked in frequency and phase. After frequency discrimination, the carrier signal is used to demodulate the reference frequency signal to provide the platform speed frequency signal. The target speed frequency signal, on the other hand, is obtained by using the reference signal to demodulate the frequency translated sum speed frequency component.

A lock detection circuit and a search sweep circuit are also provided with the frequency discriminator of this invention. If the frequency translated target speed frequency component is not equal to the frequency of the reference signal, then the lock detection circuit will inhibit the output display and activate the search sweep circuit. The search sweep circuit provides an auxillary control to the phase locked loop causing the VCO of the phase locked loop to sweep over its entire frequency range until the frequency translated platform speed frequency component approaches the reference frequency. When these two frequencies come sufficiently close to each other, the lock detection circuit inhibits the sweep operation and allows the phase locked loop to lock onto the frequency translated platform speed frequency component. Once the phase locked loop has locked onto this frequency, the detected output of the loop will vary in response to deviations in the platform speed and will adjust the VCO to maintain the lock status between these two signals. The inhibit signal is also deactivated and the output signals are once again provided for display.

It should be pointed out at this time that the frequency discrimination techniques discussed herein can also be used to separate the platform and target speed frequency components when both vehicles are moving in the same direction. When both vehicles are moving in the same direction, separation of the platform and target speed frequency components can be performed by a third band pass filter which has an operable frequency range below the reference frequency.

Even though the use of modulators for frequency translation is well known in the communications field, it has never to my knowledge been applied in the doppler radar art to separate the received doppler signal into its respective frequency components. While it is possible to directly obtain the target speed frequency component by demodulation techniques, this method of frequency discrimination is highly undesirable because prefiltering the platform and target speed frequency component is required and products of this discrimination technique tend to fall within the band of the platform and target frequencies creating spurious frequency signals. Frequency translation, on the other hand, eliminates these spurious frequencies and allows simple filtering after translation.

In a second embodiment of the present invention, the narrow band filter is replaced by a linear phase detector which is only responsive to frequency signals that are within a finite phase of the reference frequency. In order to assure that the frequency translated platform speed frequency component is locked to the reference frequency, a second linear phase detector called the lock detector is provided to compare the phase of the frequency translated platform speed frequency component with the reference signal 90° out of phase. The output of the lock detector is then sent to a lock detection circuit which determines whether or not the frequency translated platform speed frequency component is properly locked to the reference frequency. In this embodiment of my invention, a second phase locked loop, which is locked to the frequency translated platform speed frequency component, is provided to smooth the reference carrier signal produced in the first phase locked loop. The output of the second phase locked loop is then used to obtain the platform speed and target speed frequency signals. Additional lock detection circuits are also provided to assure that all phases of the separation procedure are properly locked.

It is accordingly an object of my invention to provide a doppler radar unit that uses a unique method and apparatus for detecting the speed of an approaching target vehicle when the radar platform vehicle is stationary or moving.

A further object of my invention is to provide a doppler radar unit that produces a speed readout indicative of the relative speed of the target vehicle when both the radar platform and target vehicles are in motion without the need for any mechanical linkage with the vehicle acting as the radar platform.

A further object of my invention is to provide a doppler radar unit for detecting the speed of a target vehicle that uses a simple method for separating the received doppler signal into its respective frequency components representative of the ground speed of the platform vehicle and the target vehicle.

Another object of my invention is to provide a doppler radar unit for detecting the speed of a target vehicle that does not require a great amount of complicated electrical circuitry to track the speed of the radar platform vehicle and to tune the tracking filters over the entire frequency range of interest.

A further object of my invention is to provide a doppler radar unit for detecting the speed of a target vehicle wherein the received doppler signal is separated into its various frequency components representative of the speed of the radar platform vehicle and the target vehicle by means of frequency translation techniques and fixed frequency filters.

Another object of my invention is to provide a doppler radar unit for detecting the speed of an approaching target vehicle wherein the received doppler signal is separated into its respective frequency components representative of the ground speed of the platform vehicle and the target vehicle by first frequency translating the received doppler signal upward to a preselected reference frequency, then filtering the translated signal to separate it into its speed components, and finally frequency translating the signal downward to produce speed signals representative of the speed of the radar platform vehicle and the target vehicle.

A further object of my invention is to provide a doppler radar with a monitoring system which will allow an audio signal to be heard that is a function of the target speed only and is not a function of the combined speed between the platform vehicle and the target vehicle.

A further object of my invention is to provide a doppler radar unit for detecting the speed of a target vehicle that includes a valid signal detection circuit operable to inhibit velocity display if the frequency translated platform speed frequency component is not properly locked to the preselected reference frequency.

Another object of my invention is to provide a doppler radar unit for detecting the speed of a target vehicle that includes a search sweep circuit operable to search the entire frequency of interest to lock the frequency translated platform speed frquency component to the preselected reference frequency.

A further object of my invention is to provide a doppler radar unit for detecting the speed of a target vehicle that is capable of smoothing the received doppler signal to improve the accuracy of the velocity computation.

A further object of my invention is to provide a doppler radar unit for detecting the speed of a target vehicle that requires only one antenna system.

Other and further objects of this invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 3 is a schematic illustration of the frequency translation technique used in the present invention;

FIGS. 4A and 4B are to be arranged to provide a detailed schematic diagram of the frequency discriminator circuit shown in FIG. 2;

FIG. 4C is a plot showing how FIGS. 4A and 4B are to be arranged for proper viewing; and FIG. 5 is a second embodiment of the frequency discriminator circuit shown in FIG. 1.

Figure 1:
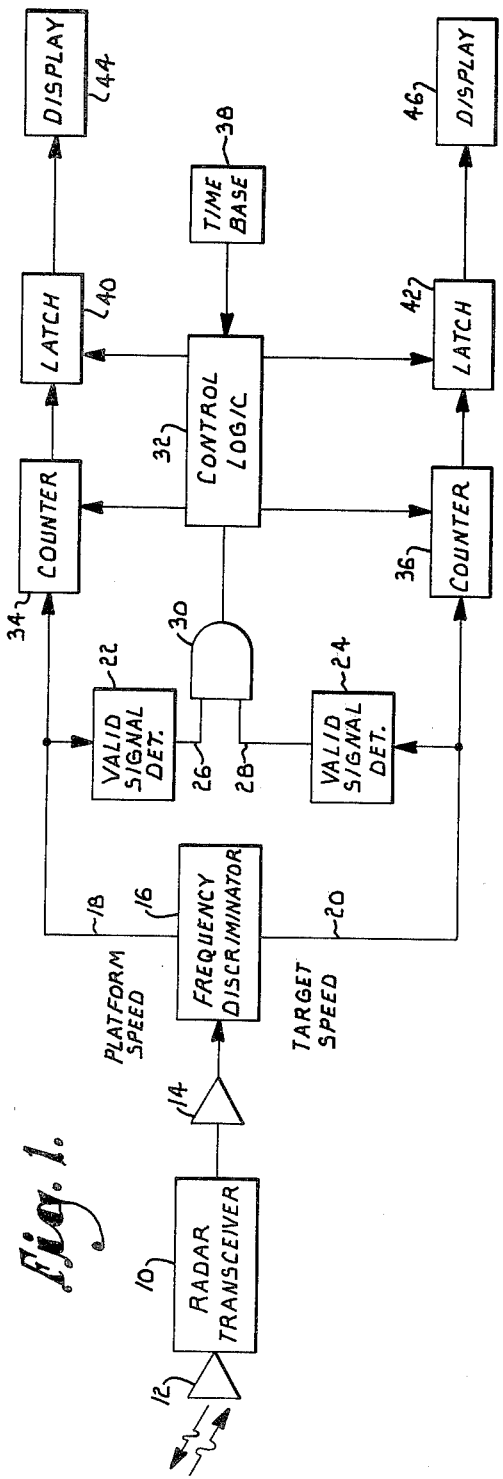
FIG. 1 is a block diagram of a radar unit for determining the speed of a target vehicle when the radar platform is stationary or moving.

The doppler radar unit of the present invention is shown in block form in FIG. 1. The doppler radar unit shown in FIG. 1 measures the ground speed of an approaching target vehicle by measuring the difference in frequency between the transmitted doppler signal and the received doppler signal reflected from the moving target vehicle. The relative motion of the target vehicle produces a corresponding frequency shift in the reflected doppler signal which is proportional to the speed of the target vehicle with respect to the radar platform. Detection of this frequency shift gives a velocity figure representative of the relative speed of the target vehicle. When platform and the target vehicles are both moving, the received doppler signal is a complex wave having frequency components related to the speed of the radar platform vehicle and the speed of the target vehicle. Therefore, the received doppler signal must be separated into its platform speed and target speed frequency components prior to measurement of this frequency shift.

As shown in FIG. 1, the dopper radar unit of the present invention includes a conventional radar transceiver 10 electrically connected to a single antenna means 12. The radar transceiver circuit is operable to generate and transmit a stable microwave signal, to receive the doppler signal reflected from the target vehicle, to mix the reflected doppler signal with a sample portion of the transmitted wave, and to amplify the doppler frequency components thus detected. The transceiver mixes the reflected signal with a sample portion of the transmitted wave to obtain the difference signals representative of platform and target speed. When the platform and target vehicles are moving toward each other, the received doppler signal is composed of at least two frequency components indicative of the ground speed of the platform vehicle and the relative speed of the target vehicle with respect to the platform vehicle. Therefore, the output of transceiver 10 is a complex wave characteristic of the algerbraic sum of the platform speed frequency component and the relative speed frequency component. After amplification of the received doppler signal in amplifier 14, the signal must be broken down into its various frequency components in order to determine target speed.

Separation of the received doppler signal into its platform speed and target speed frquency components is performed in frequency discriminator circuit 16. One of the outputs of this circuit is a frequency signal 18 which is related to the ground speed of the radar platform vehicle while the outer output of this circuit is a frequency signal 20 which is related to the ground speed of the target vehicle.

Following separation of the received doppler signal, the platform speed and target speed frequency components 18 and 20 are then sent to valid detector circuits 22 and 24 respectively. These circuits determine whether or not the received doppler signal is a valid reply to the transmitted doppler wave and inhibit speed computation and display if the platform speed and target speed frequency components are not valid reply signals. If the platform speed and target speed frequency components represent valid replies, then valid signal detector circuits 22 and 24 output validation signals on output lines 26 and 28 respectively. These output lines provide the inputs to logic and gate 30 which is electrically conencted to control logic circuit 32. The presence of a validation signal on input lines 26 and 28 causes logic gate 30 to provide an activation signal to the control logic circuit 32. This signal controls speed computation and display by inhibiting the control logic circuit if both velocity components are not valid signals.

The platform speed and target speed frequency components are also sent to platform speed counter 34 and target speed counter 36 which in combination with the control logic circuit 32 and time base circuit 38 compute the ground speed of the platform and target vehicles. Platform speed counter 34 and target speed counter 36 count the number of doppler pulses received within a specified time period established by time base 38 in conjunction with the control logic circuit 32. Control logic circuit 32 initiates and terminates the counting operation performed by platform speed counter 34 and target speed counter 36. Through proper scaling of the counting period, each pulse counted within the counting period is equal to one mile per hour so that the vehicle speed is represented by the total number of counts received within the above mentioned counting period. After the counting cycle is completed, the count state stored in these two counters is then transferred to ground speed latch 40 and target speech latch 42 for display at 44 and 46.

Figure 2:
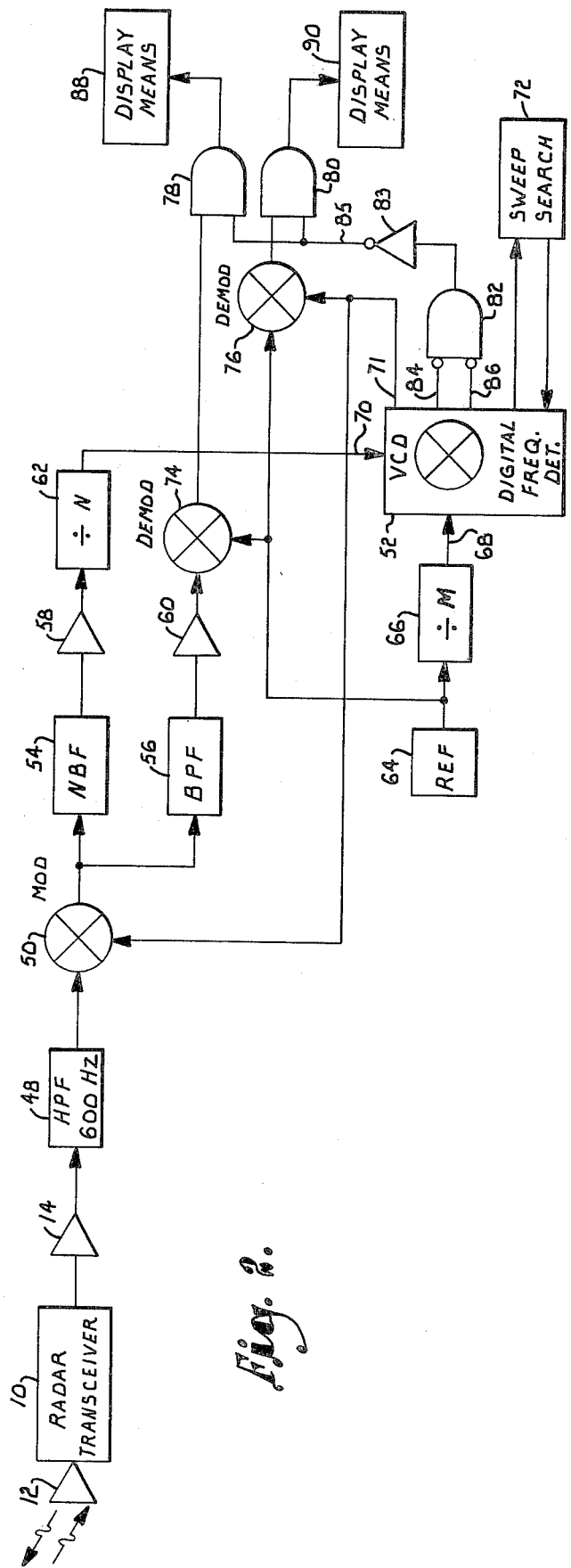
FIG. 2 is a block diagram of a frequency discriminator circuit to be used in the radar unit shown in FIG. 1.

Referring now to FIG. 2, frequency discriminator 16 is shown in greater detail in this figure. Radar transceiver 10, doppler antenna 12, and amplifier 14 are well known in the prior art and operate as described earlier with repsect to FIG. 1. In order to facilitate frequency discrimination and speed detection, the received doppler signal is passed through high pass filter 48 which suppresses frequency signals of less than 300 hz. When a microwave signal of 10.525 GHz is used as the generating source, a frequency level of 300 hz is approximately analagous to a ground speed of ten m.p.h.

As shown in FIG. 2, frequency discriminator circuit 16 includes modulator 50 for frequency translating the filtered doppler return signal to a preselected reference frequency. The frequency translated doppler signal from modulator 50 is then provided to narrow band filter 54 and band pass filter 56 for separation of this signal into its composite frequency components. The narrow band filter has a center frequency equal to the preselected reference frequency and is capable of passing frequency signals within a finite range of the reference frequency. The wide band filter, on the other hand, has an operable frequency range from slightly above the reference frequency to a maximum frequency selected in accordance with the oeprating range of the radar unit.

The separated frequency components from narrow band filter 54 and band pass filter 56 are amplified in amplifiers 58 and 60. The output of amiplifier 58 is then provided to divide by N circuit 62 where this frequency component is divided by a set number to provide a smoother signal.

Phase locked loop 52 accepts the output of divide by N circuit 62 at input 70 for comparison of this signal with a reference signal generated in reference oscillator 64. The reference oscillator is comprised of a crystal oscillator or any other means for producing a stable signal equal in frequency to the preselected reference frequency. The reference signal is divided by a constant in the divide by M circuit 66 prior to introduction of this signal to the phase locked loop at input 68. Divide by M circuit 66 divides the reference signal by a constant so that the frequency of the reference signal 68 corresponds with the output of divide by N circuit 62.

A conventional integrated circuit such as the COS/-MOS CD 4046A integrated circuit manufactured by RCA is used to make phase locked loop 52. This circuit includes a voltage controlled oscillator and a pair of phase comparators having a common signal input amplifier and a common comparator input. Phase comparator I of this circuit is an exclusion or network and phase comparator II is a phase-frequency comparator comprising an edge-controlled digital memory network. The phase locked loop is made up of phase comparator II and the voltage controlled oscillator of the COS/MOS CD 4046A integrated circuit. A loop filter is shown in FIG. 4b. These circuit elements are interconnected to form a closed frequency feedback loop. The phase locked loop compares the scaled frequency signal provided to input 70 with the scaled reference signal provided to input pin 68 and generates at output pin 71 the carrier signal for frequency translating the received doppler signal in modulator 50. This signal has a phase and frequency chosen to reduce the frequency differential between the reference signal and the input signal.

Demodulators 74 and 76 are provided to obtain the speed signals representative of the ground speed of the target and platfrom vehicles, respectively. The target speed and platform speed frequency signals are then sent to logic AND gates 78 and 80, respectively. The second input to these two logic gates comes from logic NAND gate 82 which is electrically connected to the lock detector circuitry of the phase locked loop 52. Display means 88 and 90 represent the various circuitry needed to convert the target speed and platform speed frequency signals into velocity information that can be displayed.

For the purposes of discussion, it will be assumed that the frequency of the transmitted microwave signal is 10.5256 GHz, that the platform vehicle is moving at a speed of 50 miles per hour, that the approaching target vehicle is moving at a speed of 60 miles per hour, and that the preselected reference frequency is 25 KHz. When both the platform vehicle and target vehicle are moving toward each other, the received doppler signal includes at least two frequency components. The first such component is a frequency signal of 1570.8 Hz and is representative of the speed of the platform vehicle. The second component is related to the sum, or combined speed of the platform and target vehicles and is equal to 3455.8 Hz.

In frequency discriminator 16 (FIG. 1), the received doppler signal is initially provided to modulator 50 which frequency translates this signal. Modulator 50 uses the received doppler signal to modulate the variable carrier signal generated by the voltage controlled oscillator in phase locked loop 52. Modulation of the carrier signal by the received doppler signal produces a modulated signal having an upper side band with at least two frequecny components. One of these components corresponds to the frequency translated platform speed component while the other component corresponds to the frequency translated combined (target relative to platform) speed component. Lower side band components below the reference frequency are also produced, but are suppressed by the narrow and wide band pass filters. In the preferred embodiment of the invention, the frequency of the carrier signal is varied by the phase locked loop, so as to keep the frequency translated platform speed component locked to the reference frequency. Therefore, the platform speed component is frequency translated to the reference frequency to 25 KHz while the combined speed component is frequency translated to a frequency equal to the sum of the carrier signal frequency and the combined speed frequency which in the present example is 26.885 KHz.

The frequency translated platform and combined speed frequency components are then separated by means of narrow band filter 54 and band pass filter 56. The narrow band filter has a center frequency equal to the reference frequency so that it will only pass frequency signals that are within a finite range of this frequency. Therefore, the narrow band filter will pass the frequency translated platform speed component while suppressing the frequency translated combined speed component. The band filter, on the other hand, is operable over a wider frequency range and is capable of passing the frequency translated component representative of the combined speed of the platform and target vehicles. The band pass filter is arranged to pass frequencies that are slightly greater than the reference frequency up to a maximum that is related to the highest combined speeds of interest. Since the band pass filter has an operable frequency range above the reference frequency, the frequency translated platform speed component will be suppressed by this filter. The lower side band frequencies are also suppressed by both of these filters because they are well below the operable frequency range of these two filters. In this way, the platform speed and combined speed frequency components present in the received doppler signal are effectively separated.

The frequency translated platform speed component is then amplified in amplifier 58 and divided by a constant in divide by N circuit 62 in order to provide a smoother frequency signal. The platform speed frequency component of the received doppler signal is a rough signal which deviates in response to variations in the angle from which this component is received. As the platform vehicle passes various stationary objects, the frequency of the received doppler signal is varied by the cosine of the angle formed by the transmission path of the transmitted doppler wave and the object from which the platform speed component is reflected. Division of the frequency translated platform speed frequency component reduces the frequency deviation present on this signal to a value that is only a phase deviation less than 180°.

After the frequency translated platform speed component has been divided by a constant, the signal is then inputted to comparison input 70 of phase comparator II of the phase locked loop 52. Phase comparator II compares the frequency and phase of this signal with the divided down reference signal which is generated in reference oscillator 64 and is introduced to the phase locked loop at input 68. The reference signal is divided by a constant in divide by M circuit 66 prior to introduction to the phase locked loop so that the frequency and phase of this signal will correspond with that of the scaled frequency translated platform speed component. Phase comparator II of the phase locked loop then compares the signals inputted at 68 and 70 and generates an error voltage proportional to the frequency and phase difference between these two signals. The error voltage is then filtered and provided to the control input of the VCO included in the phase locked loop. The filtered error voltage causes the VCO to vary its output signal in response to the value of this voltage so as to reduce the frequency difference between the compared signals. When the frequency of the compared signals is sufficently close, the closed loop nature of the phase locked loop forces the VCO to lock in frequency. Thereafter, a phase difference between the compared signals produces an error voltage operable to change the output frequency of the VCO in such a way as to realign the compared signals. The output of the VCO represents the carrier signal provided at output 71. Since the frequency of the carrier signal is directly related to the frequency and phase difference between the frequency translated platform speed component and the reference signal, the frequency of the carrier signal is varied to keep the frequency translated platform speed component locked to the reference frequency. In this way, the system automatically tracks the acceleration or deceleration of the platform vehicle thereby keeping the frequency translated platform speed component locked to the reference frequency.

System lock is continuosly monitored by logic gate 82 because accurate speed reading can be obtained only if the frequency translated platform speed component is locked to the reference frequency. Logic gate 82 operates in combination with the lock detector circuitry of the phase locked loop to monitor system lock. If the frequency translated platform speed component is not locked to the reference frequency, the phase locked loop provides coincident negative pulses on output lines 84 and 86. The presence of coincident negative pulses on these two output lines enables logic gate 82 to provide a high level logic signal which is inverted in inverter 83. Inversion of this signal provides at 85 a low level logic signal representative of an out-of-lock condition. However, if the frequency translated platform speed component is locked to the reference frequency, the phase locked loop does not provide coincident negative pulses on output lines 84 and 86. The absence of coincident negative pulses on output lines 84 and 86 inhibits logic gate 82 which in turn provides a positive lock signal at 85.

Upon loss of lock or initiation of the speed measuring operation, search sweep circuit 72 provides an auxiliary control to the VCO of the phase locked loop causing the VCO to scan over its entire lock range until lock is achieved. When the frequency translated platform speed component falls outside of the pass band of narrow band filter 54, the frequency signal provided to the comparator input 70 is removed causing the phase locked loop to increase the frequency of the carrier signal provided at output pin 71. The frequency of the carrier signal increases until it reaches the upper trigger point which is set in accordance with the desired highest search frequency. At this point, the phase locked loop is reset to its lowest search frequency and the frequency of the carrier signal is increased from that point until the upper trigger point is reached or lock is obtained. Once lock is obtained, the phase locked loop is put in exclusive control of the frequency of the carrier signal and the search sweep circuit is deactivated.

It should be pointed out at this time that the frequency translated platform speed component must be locked to the reference frequency prior to detection of the speed of a particular target vehicle. In fact, speed computation is inhibited until these two signals are locked together. Lock is achieved by increasing the frequency of the carrier signal until the frequency translated platform speed component approaches the reference frequency. Once these two signals are locked together, a lock signal is provided at 85.

The frequency signal representative of the ground speed of the platform vehicle is obtained by using the carrier signal to demodulate the reference signal in demodulator 76. The frequency signal representative of the ground speed of the target vehicle, on the other hand, is obtained by using the reference signal to demodulate the frequency translated sum speed component in demodulator 74. Since the frequency translated platform speed component is locked to the reference frequency, demodulation of the sum speed component with the reference signal provides a resultant frequency signal equal to the ground speed of the approaching target vehicle.

The platform and target speed frequency components are then sent to logic AND gates 80 and 78 respectively.

These gates inhibit these signals if a lock condition signal is not present at 85. However, if there is a positive lock signal at 85, these gates are enabled and provide the platform and target speed frequency signals to display means 90 and 88 for computation and display of ground speed.

The above described frequency translation operation is graphically illustrated in FIG. 3. As shown in FIG. 3, the lower line represents the frequency range of the radar unit. In other words, the radar unit represented in this figure has an operating range capable of accommodating combined speeds of up to 200 m.p.h. A speed of 200 m.p.h. produces a frequency shift in the received doppler signal equal to 6283.2 hz. For the purposes of illustration, it is assumed that the platform vehicle is moving at a speed of 50 m.p.h. (1570.8 hz), and that the target vehicle is moving at 60 m.p.h. so that the sum speed of these two vehicles is equal to 110 m.p.h. (3455.8 hz). Both of these frequency components are shown in FIG. 3. The upper line of FIG. 3 represents the translated frequency of the received doppler signal. When the radar unit is properly locked to the radar platform speed, the frequency translated platform speed component is equal to 25 KHz as indicated by line 92. The corresponding frequency translation of the sum speed frequency component is also shown in this figure by line 94. It should be pointed out at this time that the translation factor employed must be high enough to assure that the lower side band of the modulated carrier signal does not fall back into the frequency range of the incoming doppler frequencies. In other words, the reference frequency must be at a high enough frequency so that the lower side band of the modulating carrier signal does not overlap the frequency range of the input doppler frequencies. The only upper constraint on the reference frequency is that the frequency translated speed components must be within a range where they can be effectively filtered. For a radar unit having a speed range of up to 200 m.p.h. the reference frequency could be chosen to be as low as 15 KHz. Finally, the frequency discrimination process of the present invention could be performed on the lower side band components of the modulated reference carrier signal rather than the upper side band components as discussed above.

While the description so far has concentrated primarily on obtaining the ground speed of an approaching target vehicle, the techniques and apparatus disclosed herein can also be used to obtain the ground speed of a target vehicle moving in the same direction as the platform vehicle. When both vehicles are moving in the same direction, the received doppler signal is frequency translated as described above but in the typical situation is separated into its respective frequency components by the abovementioned narrow band filter and a third band pass filter which has an operable frequency range below the reference frequency.

Figure 4A:
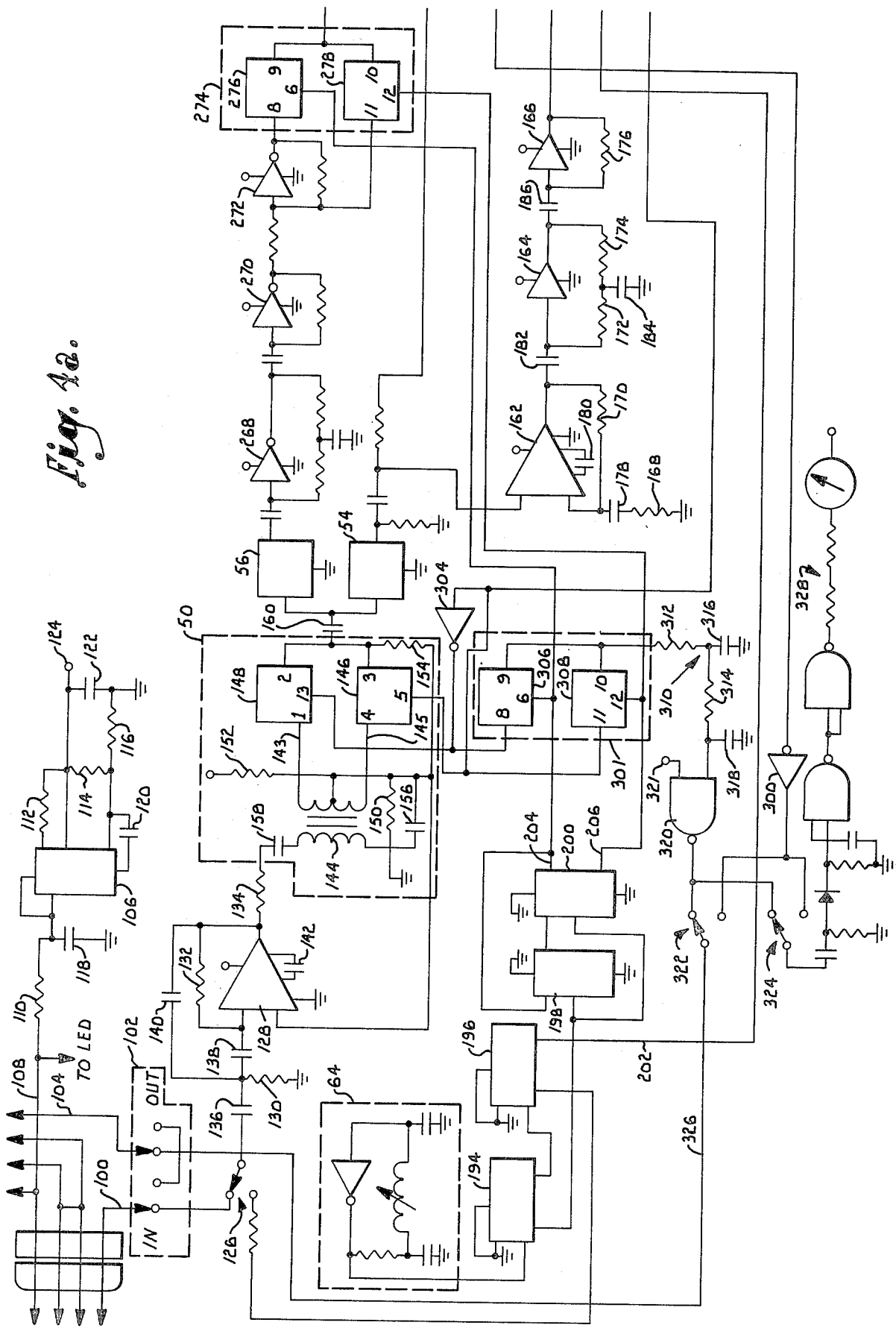

Referring now to FIGS. 4A and 4B, these figures when properly combined provide a detailed schematic diagram of the frequency discriminator circuit shown in block form in FIG. 2. The received doppler signal is inputted to the frequency discriminator circuit by means of input line 100. This line is fed directly into load control switch 102 which is operable to engage the frequency discriminator circuit of the present invention if the radar unit is being used in the moving mode of operation or to bypass the frequency discriminator circuit if the radar unit is being used in the stationary mode of operation. The frequency discriminator circuit is bypassed in the stationary mode of operation because only one dominant doppler signal representative of the target speed is received thereby eliminating the need for separation of the received signal into its respective frequency components. In the stationary mode of operation, the received doppler signal is sent directly to the speed detection circuitry by means of output line 104.

Voltage regulator 106 provides the power signal necessary for the overall operation of the present system. This circuit accepts a basic 12 volt automotive source voltage by means of input line 108. Resistors 110, 112, 114, and 116, along with capacitors 118, 120, and 122, work in conjunction with voltage regulator 106 to regulate the 12 volt automotive signal to produce a regulated voltage signal of 10 volts at output terminal 124. A switch 126 is located on the input of high pass filter 48 which allows the injection of a known frequency for use during calibration verification of the system.

The high pass filter 48 of FIG. 2 is made up of operational amplifier 128, resistors 130, 132, and 134, and the capacitors 136, 138, 140, and 142. This filter is an active filter which is operable to suppress frequency components of less than 300 hz. In this way, much of the ground clutter which accompanies the reflected doppler signal can be removed to facilitate frequency discrimination and the speed detection.

The received doppler signal is frequency translated by means of modulator 50. Modulator 50 is comprised of transformer 144, transmission gates 146 and 148, resistors 150, 152, and 154, and capacitors 156, 158, and 160. Transformer 144 has two output lines 143 and 145 which are shifted in phase by 180°. In other words, one of the outputs of transformer 144 is of the same frequency and phase as the received doppler signal while the other output of transformer 144 is equal to the frequency of the received doppler signal but shifted in phase by 180°. The operation performed by transformer 144 could also be accomplished by means of a phase inverter. Transmission gates 146 and 148 are solid state switches which are operable to modulate the carrier signal with the received doppler signal by alternately switching on and off at a rate equal to the frequency of the carrier signal. These gates are rapidly switched on and off with the frequency signal produced in transformer 144 passing through each gate when it is in an active condition. Input pin 5 on transmission gate 146 and input pin 13 on transmission gate 148 are the switching inputs which activate transmission gates 146 and 148 respectively. Activation of transmission gate 146 by the presence of a switching signal at input pin 5 causes the frequency signal inputted at pin 4 to be passed through the gate and outputted at output pin 3. Transmission gate 148 operates in exactly the same manner. The reference carrier signal is supplied to the switching input of these two gates 180° out of phase so that these gates will be alternately switched on and off for every 180° shift in phase. In this way, transmission gates 146 and 148 form a suppressed carrier, double balanced modulator operable to frequency translate the received doppler signal when the doppler unit is properly locked to this signal. Filter 54 is a narrow band pass filter used pass the platform vehicle frequency translated component while rejecting the target vehicle frequency translated component. Band pass filter 56, on the other hand, is a wide band filter which is operable over a frequency range from just above the reference frequency to a maximum frequency capable of accommodating all of the sum speeds of interest.

After the frequency translated platform speed component is separated from the sum speed component, it is amplified by amplifiers 162, 164, and 166. These amplifiers operate in combination with resistors 168, 170, 172, 174, and 176, and capacitors 178, 180, 182, 184, and 186, to amplify the frequency translated platform speed component to a constant amplitude level.

The amplified frequency translated platform speed component is then sent to the Schmitt trigger 188 where the signal is sharpened and defined. The frequency translated platform speed component is then provided to divider circuits 190 and 192 which divide the signal by a constant typically 32 to provide a smoother signal. The divided signal is then sent to the phase locked loop which is enclosed within the broken lines and generally designated by the numeral 52.

The reference signal is generated in reference oscillator 64. The reference signal produced in reference oscillator 64 is divided into the various frequencies of interest by divider circuits 194, 196, 198, and 200. The output of divider 196 is a frequency signal equal to the reference frequency scaled by a division factor equal to that used in divider circuits 190 and 192. The output signal from this circuit is provided to input pin 14 of the phase locked loop 52 by means of a terminal line 202. The output of divider circuit 200 on the other hand, is the reference frequency signal. Divider circuit 200 is provided with two outputs 204 and 206 which are 180° out of phase. In other words, the signal at output 204 and the signal at output 206 are both equal to the reference frequency but are shifted in phase by 180°.

The basic element of the phase locked loop is the COS/MOS CD 4046A integrated circuit manufactured by RCA. This circuit is identified by the numeral 53 and includes a voltage controlled oscillator (VCO) and a pair of phase comparators which have common signal and comparator inputs 3 and 14, respectively. Phase comparator I of this circuit is an exclusive—OR network and phase comparator II is an edge controlled digital memory network. Phase comparator II, low pass filter 208, and the above-mentioned VCO, are interconnected to form a closed frequency feedback loop that makes up the phase locked loop 52. Phase comparator II compares the frequency and phase of the signals provided to input pins 3 and 14 and produces an error voltage proportional to the frequency and phase difference of these two signals. The error voltage is outputted at pin 13 of circuit 53 and is provided to the RC low pass filter generally designated by the numeral 208. This filter is basically comprised of capacitor 210 and resistors 212 and 214. The filter and error voltage is then sent to the VCO by means of input pin 9 causing the VCO to vary its output frequency so as to reduce the phase and frequency difference between the scaled platform signal provided to input pin 3 and the scaled reference signal provided to input pin 14. The VCO output signal is outputted at pin 4 and is the above-mentioned carrier signal which is varied to keep the frequency translated platform speed component locked to the reference frequency. The lock range of the phase locked loop is controlled by means of resistors 216 and 218, variable resistors 220 and 222, and capacitor 224.

The search sweep circuit 72 shown in FIG. 2 is comprised of voltage comparator 226, inverter 228, transmission gate 230, and resistors 233, 235, and 236. Voltage comparator 226 compares the filtered error voltage that is being sent to the VCO of the phase locked loop with a preselected reference voltage and produces a low voltage output signal at 227 if the filtered error voltage increases above the preselected reference voltage corresponding to the maximum search frequency. The filtered error voltage is provided to voltage comparator 226 at comparator input 232. The reference voltage is produced by the voltage divider made of up resistors 233, 235, and 236, which divide the regulated 10 volt signal inputted at terminal 238 down to the appropriate reference voltage. The reference voltage is then inputted to voltage comparator 226 at 234. The output 227 of voltage comparator 226 is then provided to inverter 228. The output of this inverter is sent to the switching input 13 of transmission gate 230. The switching pins 1 and 2 of transmission gate 230 are connected to capacitor 210 by means of line 240 and to ground by means of line 242 respectively. The presence of a switching signal at input pin 13 activates transmission gate 230 thereby effectively connecting capacitor 210 to ground and momentarily discharging it, thereby dropping the VCO frequency to the low end of its range.

Phase comparator II of the CD 4046A integrated circuit 53 is designed to provide an increasing error voltage at an output pin 13 if the frequency translated platform speed component inputted to this circuit at pin 3 is not locked to the reference signal provided to input pin 14 or if there is no frequency translated platform speed component present at input pin 3. The error voltage from pin 13 is provided to low pass filter 208 before being sent to the VCO of the phase locked loop by means of input pin 9. The error voltage continues to increase until the comparison voltage is obtained or the frequency translated platform speed component is locked to the reference signal. Once the comparison voltage is obtained, voltage comparator 226 generates a low voltage signal which passes through inverter 228 before activating switching pin 13 of transmission gate 230. Activation of transmission gate 230 effectively connects capacitor 210 to ground, thereby forcing the error voltage stored on this capacitor to be likewise sent to the ground. The scanning operation of the search sweep circuit is then renewed from this point. In this way, the search sweep circuit is provided with an upper trip point and a lower starting point which correspond to the upper and lower frequencies of the search range. Phase comparator II is reset to an off condition when it trips. As the error voltage increases from zero to its maximum point, the carrier signal generated by the VCO of the phase locked loop likewise increases its frequency. In this way, the VCO is capable of scanning over its entire capture range.

After a lock condition occurs, the error voltage at output pin 13 remains below the above-mentioned trip points. However, loss of lock causes the error voltage to begin increasing to its upper trip point.

It is essential to the proper operation of the radar device that the frequency translated platform speed component be locked to the reference frequency. System lock is constantly monitored by means of phase locked loop 52, logic gate 244, Schmitt trigger 246, diode 250, resistor 252, and capacitor 254. Logic gate 244 is a NAND gate with inputs inverted and the inputs to this gate are derived from output pins 1 and 2 of integrated circuit 53. The output of logic gate 244 is sent through diode 250 to inverting Schmitt trigger 246. The output of Schmitt trigger 246 is thus provided to switching transistor 258 by means of inverter 248 and resistor 260. Switching transistor 258 controls warning light 262 which provides a warning signal when the system is out of lock.

When the phase locked loop is in lock, phase comparator II of integrated circuit 53 provides at output pin 1 a high level logic signal that includes some very short pulses produced by the inherent phase difference between input pins 3 and 14. Phase comparator I, on the other hand, outputs at pin 2 a low level logic signal when the phase locked loop is in lock. This low level logic signal also includes some very short pulses resulting from the inherent phase difference between input pins 3 and 14. The logic signals provided to output pins 1 and 2 are then sent to logic gate 244 via conductor lines 245 and 247 respectively. Logic gate 244 is inhibited when the phase locked loop is in lock thereby providing a lock signal at 249 having a low level logic state representative of a lock condition.

If the phase locked loop is out of lock, phase comparator I of integrated circuit 53 continues to provide a low level logic signal at output pin 2. However, phase comparator II changes the logic state at pin 1. In other words, integrated circuit 53 provides coincident negative pulses at outputs 1 and 2 when the phase locked loop is out-of-lock. These coincident negative signals enable logic gage 244 thereby providing a lock signal at 249 having high level logic state representative of an out-of-lock condition.

The lock signal at 249 is initally filtered by diode 250, resistor 252, and capacitor 254 to remove the above-mentioned pulses that result from the inherent phase differences between input points 3 and 14. After the lock signal is filtered, it is provided to inverting Schmitt trigger 246 before being sent to input 264 of logic gate 256 via conductor line 265. The output of inverting Schmitt trigger 246 is also provided to inverter 248 via conductor line 251 and to logic gate 320 by means of output terminal 253 which is electrically connected to input termina 321. If the phase locked loop is in lock, the output of inverting Schmitt trigger 246 is a high level logic signal which is inverted by inverter 248 thereby providing a low voltage signal to the base of switching transistor 258. This low voltage signal keeps switching transistor in a cut-off condition. Loss of lock, on the other hand, changes the logic state of the output signal from inverting Schmitt trigger 246 to a low level logic signal. This logic signal is then inverted in inverter 248 causing a positive voltage to be provided to the base of switching transistor 258. A positive voltage on the base of switching transistor 258 saturates this transistor providing a path to ground through warning light 262 and resistor 268 for the voltage signal inputted at terminal 266. Therefore, the warning light 262 is activated signifying that the frequency translated platform speed component is not locked to the reference frequency. Logic gates 256 and 320 are operable to inhibit the computational display of the target and platform speeds if the frequency translated platform speed component is not locked to the reference frequency.

The output of band pass filter 56 is amplified by amplifiers 268, 270, and 272, before it is demodulated in demodulator 274. Demodulator 274 is comprised of transmission gates 276 and 278 which are activated by the reference signal from outputs 204 and 206 of divider circuit 200. The frequency translated sum speed component is provided to the signal inputs of transmission gates 276 and 278, 180° out of phase. Operational amplifier 272 operates to shift the frequency tnalsated platform speed component by 180° so that the signal provided to input pin 8 of transmission gate 276 is 180° out of phase with the signal provided to input pin 11 transmission gate 278. The output of demodulator 274 is a frequency signal having upper and lower side band components equal to the sum and difference of the frequency translated sum speed component and the reference frequency. The lower side band component is a frequency signal representative of the ground speed of the target vehicle.

The output of demodulator 274 is then sent to active low pass filter 280 which suppresses the upper side band of the demodulator signal. Low pass filter 280 is an active filter comprised of operational amplifier 282, resistors 284, 286, 288, 290, and 292, and capacitors 294, 296, and 298. The target speed frequency signal is then sent to logic gate 256 which can be deactivated to inhibit the signal if the frequency translated platform speed component is not locked to the reference frequency. The output of logic gate 256 is than provided to amplifier 300.

The platform speed frequency component is obtained by using the carrier signal to demodulate the reference signal in demodulator 301. The reference carrier signal outputted at pin 4 of integrated circuit 53 is first sent to amplifier 302 and then to phase inverter 304. The reference carrier signal is provided to signal inputs 8 and 11 of transmission gate 306 and 308, 180° out of phase. The switching input of transmission gates 306 and 308 are activated by the reference signal provided at outputs 204 and 206 of divider circuit 200. The demodulated output of demodulator 301 is a frequency signal having upper and lower side band components equal to the sum and difference of the frequency of the reference carrier signal and the frequency of the reference signal respectively. The lower side band component is a frequency signal representative of the speed of the platform vehicle.

The output of demodulator 301 is then sent to low pass filter 310 which suppresses the upper side band component of the demodulated signal. Low pass filter 310 is a simple RC filter comprised of resistors 312 and 314 and capacitors 316 and 318. The filtered signal is then provided to logic gate 320 which is activated by 246 when the VCO is in lock and produces a signal at circuit logic voltage levels for digital processing.

Switching mechanism 322 is provided to select the speed signal to be provided to the speed computation circuitry by means of output line 326. This signal is transmitted by means of line 326 to the proper speed counter shown in FIG. 1. Switching mechanisms 322 and 324 receive their respective inputs from either gate 320 or gate 300. Switching mechanism 324 is provided to direct one of the speed signals to the analog frequency meter 328 which is calibrated in terms of miles per hour.

Referring now to FIG. 5, an alternate embodiment of the present invention is shown in this figure. In this embodiment, the received doppler signal is frequency translated by means of ground speed modulator 400 and target speed modulator 402. Ground speed modulator 400 frequency translates the received doppler signal by using this signal to modulate a carrier signal produced by voltage controlled oscillator 404. Target speed modulator 402, on the other hand, uses the received doppler signal to modulate a smoother version of the carrier signal produced by voltage controlled oscillator 406.

The modulated output signal from ground speed modulator 400 is amplified by amplifier 408 which builds the signal up to an appropriate level for detection. An optional feature of this system is the inclusion of automatic gain control which is indicated by numeral 410. This feature prevents overload of the phase detectors and optimizes input levels. The automatic gain control can also be connected to the preamplifier to prevent overload of the first modulator.

The filtering function performed by narrow band filter 54 (shown in FIGS. 2 and 4) is accomplished in this embodiment by control demodulator 412, reference oscillator 414, lock demodulator 416, and lock detection circuit 418. Control demodulator 412 and lock demodulator 416 are linear type phase detectors which measure the phase difference between the frequency translated platform speed component and the reference signal produced in reference oscillator 414. Reference oscillator 414 provides a reference signal with a zero degree shift in phase at output 420. The reference signal outputted at 422, however, is shifted in phase by 90°.

Control demodulator 412 is operable to compare the phase of the frequency translated platform speed component with the reference signal. The output 424 of control demodulator 412, is an error voltage related to the phase difference between these two signals. When the frequency translated platform speed component is properly locked to the reference frequency the error voltage from control demodulator 412 is a low voltage signal just sufficient to control the VCO over its range. The output 424 of control demodulator 412 is then sent to loop filter 426 where it is filtered before being used by VCO 404 to adjust the reference carrier signal to align the frequency translated platform speed component with the reference signal. In other words, the error voltage produced in control demodulator 412 is used to adjust the reference carrier signal to reduce the phase difference between the frequency translated platform speed component and the reference signal.

Lock demodulator 416, on the other hand, is provided to determine if the control demodulator is properly locked to the reference frequency signal. This demodulator compares the phase of the frequency translated platform speed component with the reference signal shifted in phase by 90°. If the frequency translated platform speed component is properly locked to the reference frequency, then the output 428 of lock demodulator 416 will be near a maximum value. However, the output voltage at 428 will average zero if the frequency translated platform speed component is not properly locked to the reference frequency. The lock indication signal at 428 is then sent to lock detection circuit 418 which monitors this signal to determine if the frequency translated platform speed component is properly locked to the reference frequency. The output of lock detection circuit 418 is sent by means of output line 430 to search oscillator 432 and logic gate 434. If there is no lock indication signal at 428, then lock detection circuit 418 will not output a lock signal on output line 430. The absence of a lock signal on line 430 initiates the searching operation performed by search oscillator 432. Search oscillator 432 sweeps over the entire lock range until the frequency translated platform speed component is locked to the reference frequency causing a lock indication signal to be produced at lock demodulator output 428. The presence of a lock indication signal at output 428 activates lock detection circuit 418 thereby providing an output signal on line 430 which terminates the searching operation of the search oscillator 432.

As discussed above, the incoming platform speed component is a rough signal which varies in relation to the cosine of the angle formed by the transmission path of the doppler wave and the reflection path of the doppler speed component. In order to keep the frequency translated platform speed component locked to the reference frequency, the carrier signal produced by VCO 404 must vary in response to the deviations of the received doppler signal.

Divide by N circuit 436 divides the carrier signal produced by VCO 404 by a constant to provide a smoother carrier signal. The output of divide by N circuit 436 is then provided to mixer 438 where the frequency and phase of this signal is compared with the smoother carrier signal produced by VCO 406. The smoother carrier signal produced by VCO 406 is divided by a constant in divide by N circuit 444 before it is provided to mixer 438 for comparision with the carrier signal produced in VCO 404. The division constant used in divide by N circuit 444 is equal to the division constant employed in divide by N circuit 436. Mixer 438 compares the frequency and phase of these two signals and provides an error voltage which corresponds to the frequency and phase difference between these two signals. This error voltage is then provided to loop filter 440 where it is filtered before being used by VCO 406 to produce a smoother carrier signal of the appropriate frequency and phase. In this way, the carrier signal produced by VCO 406 is a smoother (with less instantaneous FM) version of the carrier signal produced by VCO 404. Lock detect circuit 446 is provided to determine if the smoother carrier signal from 406 is appropriately locked to the carrier signal produced in VCO 404.

The smoother carrier signal produced in VCO 406 is used to frequency translate the received doppler signal by means of target speed modulator 402. Target speed modulator 402 uses the received doppler signal to modulate the smooth carrier signal of VCO 406. The modulated doppler wave is then provided to band pass filter 448 which passes the frequency translated sum speed component. Amplifier 450 is provided to amplify the frequency translated sum speed component prior to demodulation.

The smoother carrier signal of VCO 406 is provided to demodulator 452 and to modulator 402 to obtain the platform speed and target speed frequency signals respectively. Demodulator 452 uses the reference signal produced by reference oscillator 414 to demodulate this carrier signal. The output of demodulator 452 is a complex wave having frequency components equal to the sum and difference of the frequency of the smoother carrier signal and the frequency of the reference signal. The difference frequency component has a frequency representative of the speed of the platform vehicle. The output of demodulator 452 is then provided to low pass filter 456 which suppresses the combined speed component from demodulator 452. Demodulator 454, on the other hand, uses the reference signal produced by reference oscillator 414 to demodulate the combined speed frequency component passed by band pass filter 448. Dedmodulation of the combined speed frequency component in this manner provides a complex wave having frequency components equal to the frequency of the sum and difference of the combined speed component and the reference signal. The difference frequency signal represents the ground speed of the approaching target vehicle. The output of demodulator 454 is then provided to low pass filter 458 which filters out the unwanted combined speed frequency component of the demodulated target speed frequency signal.

Amplifiers 460 and 462 are provided to amplify the platform speed and target speed frequency signals respectively. The amplified platform speed frequency signal is then provided to logic gate 464 which inhibits display of this speed signal if the frequency translated platform speed component is not properly locked to the reference frequency or if the carrier signal of VCO 406 is not properly locked to the carrier signal produced in VCO 404. Similarly, the target speed frequency component is amplified in amplifier 462 before being provided to logic gate 466. Logic gate 466 operates in the same manner as does logic gate 464. Display means 468 and 470 provide the circuitry necessary to convert the speed signals into digital or analog speed information that can be displayed.

In operation, the received doppler signal is provided to ground speed modulator 400 and target speed modulator 402. The frequency discriminator shown in FIG. 5 must be initially locked to the platform speed component before the received doppler signal can be separated into its respective speed components. In order to lock the frequency translated platform speed component to the referency frequency, search oscillator 432 provides a scanning signal to VCO 404 which causes it to scan over its entire frequency range. Therefore, VCO 404 will output a carrier signal which is constantly sweeping its frequency. Once the sum of this carrier signal and the platform speed component equals the preselected reference frequency, lock demodulator 416 provides a lock indication signal at 428 which in turn causes the lock detection circuit 418 to deactivate search oscillator 432. Thereafter, lock between the frequency translated platform speed component and the reference signal is controlled by control demodulator 412. Control demodulator 412 compares the phase difference between the frequency translated platform speed component and the reference signal and produces an error voltage proportional to this difference. The error voltage is then provided to VCO 404 to vary the frequency of the carrier signal produced by this circuit so as to reduce the phase difference between the frequency translated platform speed component and the reference signal.

The carrier signal from VCO 404 is also provided to mixer 438 after it has been divided by a constant in divide by N circuit 436. Mixer 438 compares the scaled carrier signal with the output of a second voltage controlled oscillator 406 and produces an error voltage proportional to the difference in the frequency and phase of these two signals. The output of VCO 406 is a carrier signal which is a smoother version of the carrier signal produced by VCO 404. The error voltage from mixer 438 is provided to VCO 406 to vary the frequency of the smoothed carrier signal produced by this circuit so as to reduce the frequency and phase difference between the scaled reference carrier signal and the scaled and smoothed reference signal.

The smoothed reference carrier signal produced by VCO 406 is used by the target speed modulator 402 to frequency translate the incoming doppler signal. The frequency translated sum speed component is then separated from the frequency translated platform speed component by means of band pass filter 448. The frequency translated combined speed component is then demodulated is demodulator 454 using the reference signal to provide a frequency signal representative of the target speed. The smoothed reference carrier signal produced by VCO 406 is demodulated in demodulator 452 using the reference signal to provide a frequency signal representative of platform speed.

Logic gate 434 inhibits the computation and display of the platform speed and target speed if the frequency translated platform speed component is not locked to the reference signal or if the smoothed reference carrier signal is not locked to the reference carrier signal. If these signals are properly locked, then logic gate 434 will be enabled providing an activation signal to logic gates 464 and 466.

From the foregoing, it will be seen that this invention is one well adapted to attain all of the ends and objects herein set forth together with other advantages which are obvious and which are inherent to the structure.

It will be understood that certain features and subcombinations are of utility and may be employed without reference to other features and subcombinations. This is contemplated by and is within the scope of the claim.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A frequency discriminator for use in a doppler radar device operable to determine the speed of a target vehicle when the radar platform vehicle is moving, said doppler radar device having a receiving means operable to receive a composite doppler signal having frequency components relating to the speed of said target vehicle and the speed of said radar platform vehicle, said frequency discriminator comprising:
   means for frequency translating the received doppler signal to lock one of the frequency translated components to a preselected reference frequency;
   means for separating the frequency translated doppler signal into a first frequency translated component and a second frequency translated component;
   means for frequency translating said first frequency translated component to produce a signal suitable for a first speed measurement display.

2. The invention in claim 1 including a frequency tracking means having a frequency translating means therein, said frequency tracking means being capable of producing a signal suitable for a second speed measurement display.

3. The invention in claim 1 including means for verifying the locked condition of said second frequency translated component to said reference frequency.

4. The invention in claim 3 including means for inhibiting speed display if said second frequency translated component is not locked to said reference frequency.

5. The invention in claim 3 including means for inhibiting conversion of said first and second speed components into speed information if said second frequency translated component is not locked to said reference frequency.

6. The invention in claim 1 wherein said means for frequency translating the received doppler signal is comprised of:
   a phase locked loop means for generating a carrier signal having a variable frequency related to the frequency of said platform vehicle frequency component; and means for modulating said carrier signal in response to the received doppler signal.

7. The invention in claim 6 wherein said means for frequency translating the received doppler signal includes means for generating a reference signal having a constant frequency equal to said reference frequency.

8. The invention in claim 1 wherein said separating means is comprised of:
a narrow band pass filter means for passing said second frequency translated component while suppressing the first frequency translated component, said narrow band bass filter means having a center frequency equal to said reference frequency; and
a wide band pass filter means for passing the first frequency translated component while suppressing said second frequency translated component.

9. The invention in claim 1 wherein said separating means is comprised of:
means for generating a first reference signal having a constant frequency equal to said reference frequency and a second reference signal having a frequency equal to said first reference signal but 90° out of phase;
first phase comparator means for comparing the phase of said second frequency translated component with said first reference signal, said first phase comparator means being operable to provide a difference voltage related to the phase difference between said second frequency translated component and said first reference signal; and
second phase comparator means for comparing the phase of said second frequency translated component with said second reference signal, said second phase comparator means being operable to provide a lock voltage related to the phase difference between said second frequency translated component and said second reference signal.

10. The invention in claim 9 including means for monitoring the value of said lock voltage to determine if said second frequency translated component is locked to said reference frequency.

11. The invention in claim 10 wherein said means for frequency translating the received doppler signal is comprised of:
means for filtering said difference voltage;
a voltage controlled oscillator operable to generate a variable first carrier signal in response to said filtered difference voltage; and
means for modulating said first carrier signal in response to the received doppler signal.

12. The invention in claim 11 including a phase locked loop means for producing a second carrier signal, said second carrier signal being a smoothed version of said first carrier signal.

13. The invention in claim 12 including means for determining if second carrier signal is locked to said first carrier signal, said determining means being operable to inhibit speed display if these two signals are not determined to be locked.

14. The invention in claim 13 including means for modulating the second carrier signal in response to the received doppler signal.

15. The invention in claim 13 including a wide band pass filter means for suppressing said second frequency translated component while passing the first frequency translated component.

16. The invention in claim 15 wherein said means for frequency translating said first frequency translated component is comprised of means for using said first reference signal to demodulate said first frequency translated component.

17. A doppler radar device for determining the speed of a target vehicle when the radar platform vehicle is moving, said device comprising:
a means for receiving a composite doppler signal having frequency components relating to the speed of said target vehicle and the speed of said radar platform vehicle;
means for frequency translating the received doppler signal so as to lock the frequency translated component resulting from the platform vehicle speed to a preselected reference frequency;
means for separating the frequency translated doppler signal into a first frequency translated component and a second frequency translated component;
means for frequency translating said first frequency translated component to provide a first speed component;
means for converting said first speed component into speed information; and
means for displaying said speed information of said first speed component.

18. The invention in claim 17 including:
means for frequency translating said second frequency translator component to produce a second speed component;
means for converting said second speed component into speed information; and
means for displaying said speed information of said second speed component.

19. The invention in claim 17 including means for providing a smooth representation of said second frequency translated component to facilitate conversion of the separated frequency components into speed information.

20. The invention in claim 17 including means for verifying the locked condition of said first frequency translated component to said reference frequency.

21. The invention in claim 20 including means for inhibiting speed display if said first frequency translated component is not locked to said reference frequency.

22. The invention in claim 20 including means for inhibiting conversion of said first speed component into speed information if said first frequency translated component is not locked to said reference frequency.

23. The invention in claim 17 wherein said means for frequency translating said first frequency component is comprised of a means for using said reference signal to demodulate said first frequency translated component.

24. The invention is claim 17 wherein said separating means is comprised of:
means for generating a first reference signal having a constant frequency equal to said reference frequency and a second reference signal having a frequency equal to said first reference signal but 90° out of phase;
first phase comparator means for comparing the phase of said second frequency translated component with said first reference signal, said first phase comparator means being operable to provide a difference voltage related to the phase difference between said second frequency translated component and said first reference signal; and
second phase comparator means for comparing the phase of said one frequency translated component with said second reference signal, said second phase comparator means being operable to provide a lock voltage related to the phase difference between said second frequency translated component and said second reference signal.

25. The invention in claim 24 including means for monitoring the value of said lock voltage to determine if said one frequency translated component is locked to said reference frequency.

26. The invention in claim 25 wherein said means for frequency translating the received doppler signal is comprised of:
means for filtering said difference voltage;
a voltage controlled oscillator operable to generate a variable first carrier signal in response to said filtered difference voltage; and
means for modulating said first carrier signal in response to the received doppler signal.

27. The invention in claim 26 including a phase locked loop means for producing a second carrier signal, said second carrier signal being a smoother version of said first carrier signal.

28. The invention in claim 27 including means for determining when the second carrier signal is locked to said first carrier signal, said determining being operable to inhibit speed display if these two signals are not determined to be locked.

29. The invention in claim 28 including means for modulating the second carrier signal in response to the received doppler signal.

30. The invention in claim 28 including a wide band filter means for suppressing said second frequency translated component while passing the first frequency translated component.

31. The invention in claim 30 wherein said means for frequency translating said first frequency translated component is comprised of means for demodulating said first frequency translated component with said first reference signal.

32. A method for separating the doppler signal received from a target vehicle by a moving platform having a doppler radar transceiver thereon into composite frequencies, said step comprising the steps of:
frequency translating the received doppler signal so as to lock a frequency translated component thereof to a preselected reference frequency;
filtering the received doppler signal into a first frequency translated component and a second frequency translated component; and
frequency translating said first frequency translated component to provide a first signal suitable for displaying speed information.

33. The method as in claim 32 including the step of frequency translating said second frequency translated component to provide a second signal suitable for displaying speed information.

34. The method as in claim 33 including the steps of displaying one of said signals in terms of speed information, and inhibiting speed display if said one frequency translated component is not locked to said reference frequency.

35. The invention as in claim 32 including the step of aurally monitoring the target vehicle speed.

* * * * *